N. FINCK.
Improvement in Liquid Meters.
No. 119,699.                          Patented Oct. 10, 1871.
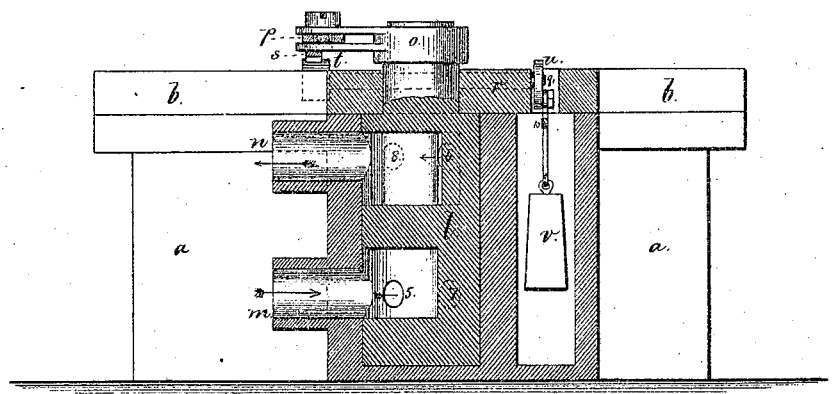
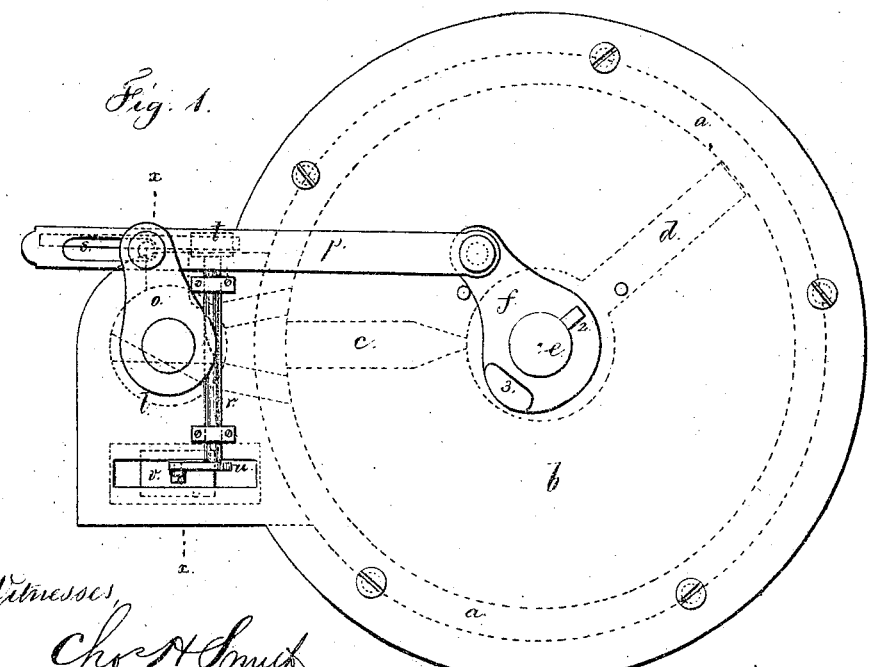

UNITED STATES PATENT OFFICE.

NICHOLAS FINCK, OF ELIZABETH, NEW JERSEY, ASSIGNOR TO HIMSELF AND EDWARD P. BRAY, OF SAME PLACE.

IMPROVEMENT IN LIQUID-METERS.

Specification forming part of Letters Patent No. 119,699, dated October 10, 1871.

*To all whom it may concern:*

Be it known that I, NICHOLAS FINCK, of Elizabeth, in the county of Union and State of New Jersey, have invented an Improvement in Water-Meters; and the following is declared to be a correct description of the said invention.

Water-meters have been constructed with a swinging piston and a four-way cock for admitting water to first one side and then the other, and alternating the exhaust-openings. My invention is made for insuring the proper movement of the four-way cock so as to prevent the possibility of the said cock standing partially open so that the water can pass through without being measured or registered.

In the drawing, Fig. 1 is a plan of the said meter, and Fig. 2 is a vertical section at the line $x$ $x$.

A circular case, $a$, is provided with a removable cover, $b$, and an abutment, $c$, shown by dotted lines. The swinging piston $d$, also shown by dotted lines, is upon the shaft $e$, that is suitably packed, and passes through the crank $f$ loosely. Upon this shaft $e$ is a block, 2, and upon the crank $f$ a block, 3, so that said crank will only be moved when the piston $d$ is approaching its extreme movements in either direction. The cock $l$ is made with openings similar to cocks that have been heretofore made, so that when turned in one position the liquid is allowed to flow in at the induction-port 5 and out at the port 6, and in the other position the ports 5 and 6 are closed and the inlet 7 and outlet 8 are opened. $m$ is the supply-pipe and $n$ the delivery-pipe. This cock $l$ is provided with a crank-arm, $o$, that is connected to the crank $f$ by a slotted connecting-rod, $p$; which rod $p$, hence, can move endwise a considerable distance without moving the arm $o$. I avail myself of this movement to actuate a weight or spring that gives motion suddenly to the cock $l$. Upon or attached to the rod $p$ is a rack, $s$, shown by dotted lines in Fig. 1, that operates the pinion $t$ upon the shaft $r$, and at the end thereof is the crank $u$, with a connecting-rod to a weight, $v$, or a spring. As the piston $d$ nears the end of its swinging movement in one direction, it gives motion to the arm $f$, rod $p$, and shaft $r$, lifting the weight $v$, and after the crank $u$ has passed its highest point, so that the weight or spring reacts to rotate said shaft $r$, the end of the slot in $p$, taking against the crank-pin of $o$, turns the cock $l$, suddenly changing the inlet and outlet-ports, so that the piston is moved by the water back again in the other direction; and the rod $p$ operates to turn the shaft $r$ the other way, reversing the action and again changing the cock $l$ to the first position, so that the aforesaid movements are repeated. An indicating or counting apparatus, connected with these moving parts in any convenient manner, indicates the quantity of water passing through the meter. The action of the weight or spring, as the crank $u$ passes its center point, may be momentarily suspended until the force of water is sufficient to separate the two inclines at 9 and 10 that come in contact at this moment, so as to cause the movement to be more sudden when the inclines clear each other.

I claim as my invention—

The shaft $r$, arm $u$, and weight or spring $v$ actuated by the link $p$, in combination with the four-way cock $l$, arms $f$ and $o$, and swinging piston $d$, substantially as and for the purposes set forth.

Signed by me this 26th day of July, A. D. 1871.

NICHOLAS FINCK.

Witnesses:
   CHAS. H. SMITH,
   GEO. T. PINCKNEY.

(39)